United States Patent [19]
Dellaverson et al.

[11] Patent Number: 5,872,523
[45] Date of Patent: Feb. 16, 1999

[54] TARGET DEVICE AND METHOD FOR ESTABLISHING A COMMUNICATION PATH IN A NETWORKED COMMUNICATIONS SYSTEM

[75] Inventors: Louis P. Dellaverson, Barrington; I. Riley Jackson, Jr. II, Schaumburg; Thomas A. Freeburg, Arlington Heights, all of Ill.

[73] Assignee: Motorola, Inc., Schaumburg, Ill.

[21] Appl. No.: 614,114

[22] Filed: Mar. 12, 1996

[51] Int. Cl.$^6$ .............................. H04Q 5/22; H01J 13/00; G06F 13/00; H04M 7/00
[52] U.S. Cl. .................... 340/825.52; 395/200; 395/311; 379/219; 455/422
[58] Field of Search ....................... 340/825.52, 875.07, 340/825.21; 300/825.72; 395/187.01, 200.16, 200.2, 311, 410; 379/219; 370/312; 455/422, 433, 435

[56] References Cited

U.S. PATENT DOCUMENTS

| 5,276,680 | 1/1994 | Messenger | 370/85.1 |
| 5,307,400 | 4/1994 | Sawyer et al. | 379/59 |
| 5,566,236 | 10/1996 | MeLampy et al. | 379/201 |
| 5,627,829 | 5/1997 | Gleeson et al. | 370/230 |

FOREIGN PATENT DOCUMENTS

| 2276061 | 9/1994 | United Kingdom . |
| 2280086 | 1/1995 | United Kingdom . |

*Primary Examiner*—Michael Horabik
*Assistant Examiner*—Anthony A. Asongwed
*Attorney, Agent, or Firm*—Thomas G. Berry

[57] ABSTRACT

A target device (18) performs the steps of receiving a broadcast message via an out-of-band paging network (14) which message includes an identification of the sourcing device. The subscriber (18) automatically registers, responsive to the receipt of the broadcast message, with a local communication server (22) associated with an in-band communications network (12). The target subscriber (18) then uses the identification of the sourcing device (16) to respond to the communication from the sourcing device (16) to establish a communication path therewith through the local communication server (22). In a preferred embodiment, the target subscriber unit and method reside in an asynchronous transfer mode (ATM) network. In this manner, the present invention establishes a direct communication path between the local communications server (22) to which the target subscriber unit (18) is attached and the sourcing device (16) thereby minimizing network trafficking and inefficiency problems.

17 Claims, 5 Drawing Sheets

5,872,523

TARGET DEVICE AND METHOD FOR ESTABLISHING A COMMUNICATION PATH IN A NETWORKED COMMUNICATIONS SYSTEM

FIELD OF THE INVENTION

This invention relates generally to networked communications systems and, more particularly, relates to a target device and a method for establishing a communication path with a sourcing device via a networked communications system.

BACKGROUND OF THE INVENTION

Methods for locating and routing to target devices' (e.g., mobile or portable radios or subscriber units) communications from sourcing devices (e.g., mail servers, fixed or mobile subscriber units, etc.) in conventional networks are known in the art. For example, via a wired line network, e.g., the internet, a mobile target device must first register with the visited, local communications server to which it is attached before the sourcing device can locate and route communications thereto. Registration with the local communications server is accomplished using a Dynamic Host Configuration Protocol (DHCP), which provides the target device with an Internet Protocol (IP) address for the session. In addition, the target device must advise the local communications server with the IP address of its home communications server. The local communications server then informs the home communications server with the DHCP address of the target device.

For the sourcing device to communicate with the target device, the sourcing device must send a Transmission Control Protocol (TCP) packet addressed to the target device. The home communications server intercepts the TCP packet, prepends the IP address of the local communications server thereto, and forwards the TCP packet to the target device via the local communications server. The local communications server strips the prepended IP address and forwards the TCP packet to the target device.

As this method is performed for each communication packet issued by the sourcing device, the sourcing device never learns of the true location of the target device. Therefore, since no direct connection is achieved between the local communications server to which the target device is attached and the sourcing device, this method suffers the disadvantage of requiring unnecessary communications to and from at least one unneeded network communications server. These extra communications flood the network resulting in a diminution of the bandwidths available to other network users and, accordingly, undesirably reduces the profitability of operating the network. Furthermore, this method is also seen to require the use of additional, prepended addressing which functions to increase the communication packet size. This increase in communication packet size also tends to reduce network efficiency.

Similarly, in a wireless system, e.g., Cellular Digital Packet Data (CDPD) systems, the mobile target device must first register with the visited network Mobile Database System (MDBS) or local communications server to which it is attached before the sourcing device can locate and route communications thereto. Registration with the local communications server is accomplished by the target device using a Mobile Network Registration Protocol (MNRP). The local communications server thereafter notifies its Mobile Data Intermediate System (MD-IS) of the visiting target device for the purpose of registering the target device therewith. This procedure must be repeated every time the target device migrates from one cell to the next.

For the sourcing device to communicate with the target device in a wireless system, the sourcing device must send an IP packet addressed to the target device, i.e., must call the target device. This packet is routed to the local communications server which, in turn, uses a Mobile Network Location Protocol (MNLP) to reroute the packet to the MD-IS. The MD-IS then forwards the packet to the local communications server and, accordingly, the target device. Again, since all subsequent communication packets follow the same route, no direct connection is achieved between the local communications server to which the target device is attached and the sourcing device. Therefore, this method also is seen to suffer the same disadvantages previously discussed with respect to wireline systems. Furthermore, as a subscriber unit in a wireless system, e.g., cellular phone, typically relies upon batteries for power, the performance of this method is also seen to reduce battery life as the target subscriber unit needs to continually transmit to and re-register with the MDBS for each cell being passed through. Otherwise, communication packets from the sourcing device cannot be received.

As such, it is seen that a need currently exists for an improved target subscriber unit and method for establishing a communication path in a networked communications systems. Preferably, such a method and apparatus will be free of the drawbacks associated with the prior art, specifically, the drawbacks of causing a diminution of available bandwidths, the inefficiencies associated with re-addressing communication packets, and the unnecessary draining of batteries should batteries be used to power the portable target subscriber unit.

DETAILED DESCRIPTION OF A PREFERRED EMBODIMENT

In a networked communications system, including an in-band communications network and an out-of-band paging network, a method of establishing a communication path between a sourcing device and a target device comprises the steps of sending a broadcast message via the out-of-band paging network; receiving at the target device the broadcast message; causing the target device to automatically register, in response to the receipt of the broadcast message, with a local communications server within the in-band communications network; providing the target device with a temporary location identifier; sending a response to the sourcing device including at least the temporary location identifier; and using the response to establish the communication path via the in-band communications network.

More particularly, a target subscriber unit and a method of establishing a communication path with a sourcing LEFT OFF HERE in a networked communications system is provided. The method comprises the steps of receiving a broadcast message which comprises an identification of the sourcing subscriber unit; automatically registering, responsive to the receipt of the broadcast message, with a local communications server; and using the identification of the sourcing subscriber unit to respond to the communication from the sourcing subscriber unit to establish a communication path therewith through the local communication server. In this manner, the present invention establishes a direct communication path between the local communications server to which the target subscriber unit is attached and the sourcing subscriber unit, thereby minimizing the network trafficking and inefficiency problems associated with the prior art. Furthermore, providing the target subscriber unit with the ability to automatically register with the local communications server in response to a broadcast message eliminates the need to constantly update the registration with the each local communications server visited thereby allowing battery life to be extended in battery powered target subscriber units.

Figure 1:
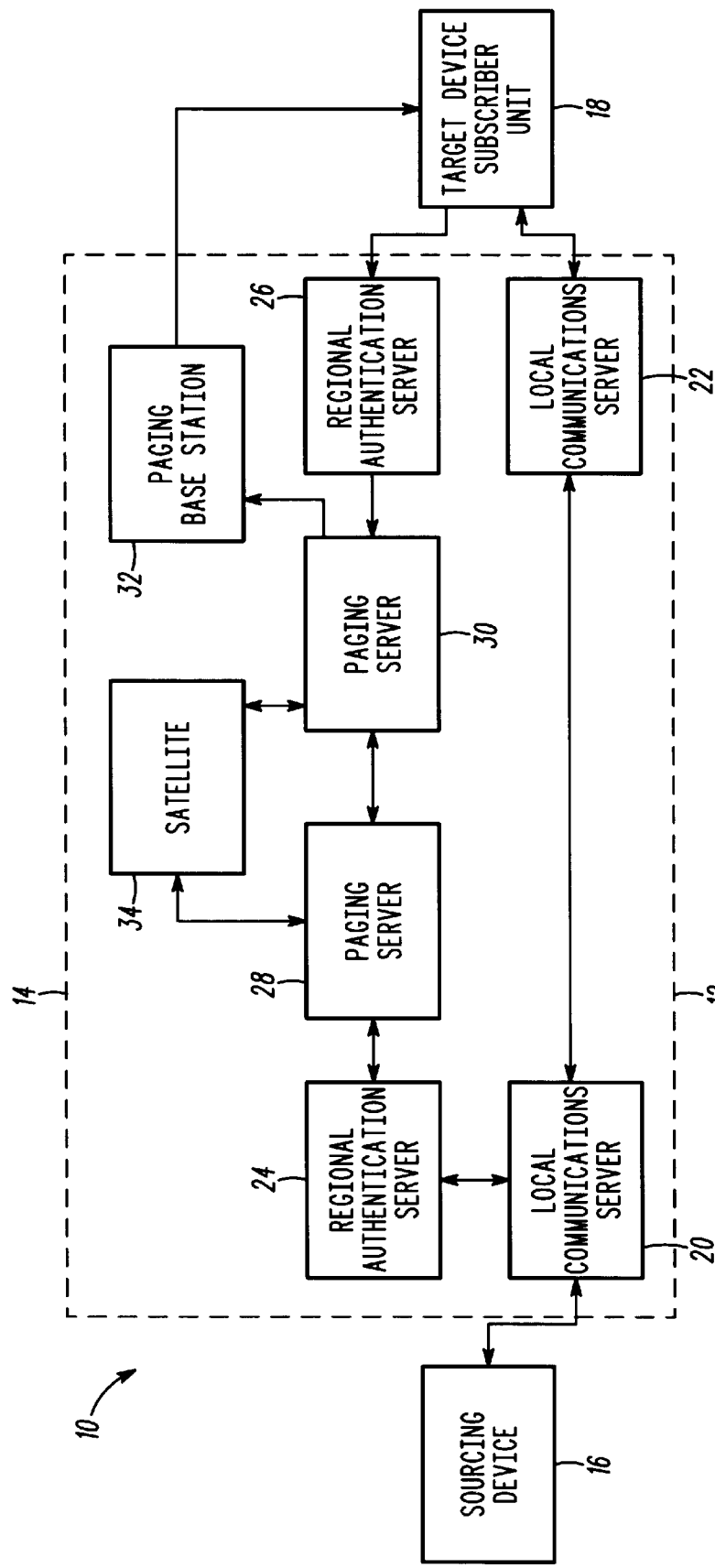
FIG. 1 illustrates a block diagram of a network communications system, in accordance with the present invention.

Referring now to the FIGS., wherein like reference numerals refer to like elements, there is illustrated in FIG. 1 a block diagram illustrating a preferred embodiment of a networked communications system 10 in accordance with the present invention. The networked communications system 10 is comprised of an in-band communications network 12 and an out-of-band paging network 14, through which a sourcing subscriber unit 16 locates and establishes a communication path with a target subscriber unit 18. Associated with the in-band communications network 12 is a pair of local communications servers 20,22. Associated with the out-of-band paging network is a pair of regional authentication servers 24,26, a pair of paging servers 28,30, a paging base station 32, and a satellite 34.

Figure 2:
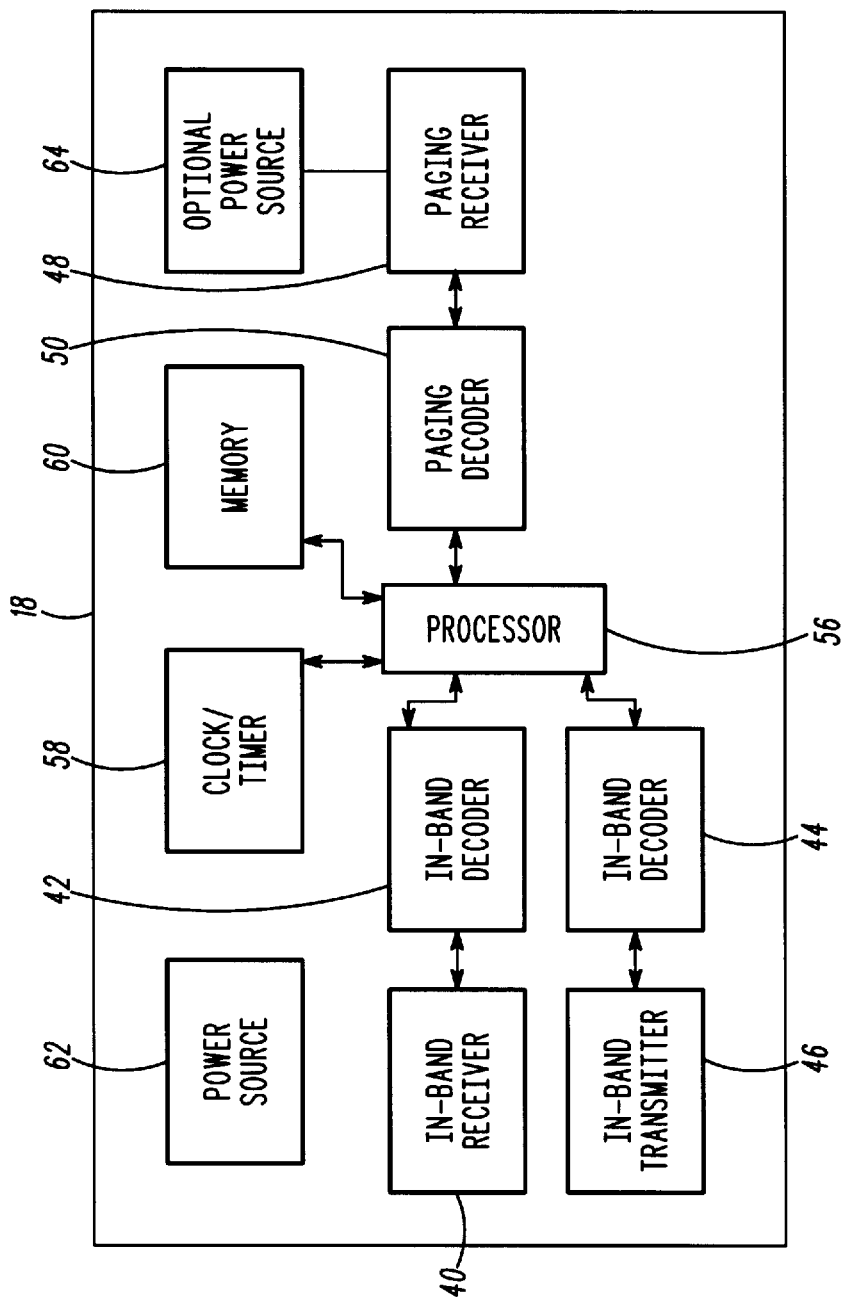
FIG. 2 illustrates a block schematic diagram of an exemplary target subscriber unit for use in conjunction with the networked communications system illustrated in FIG. 1.
Figure 3A:
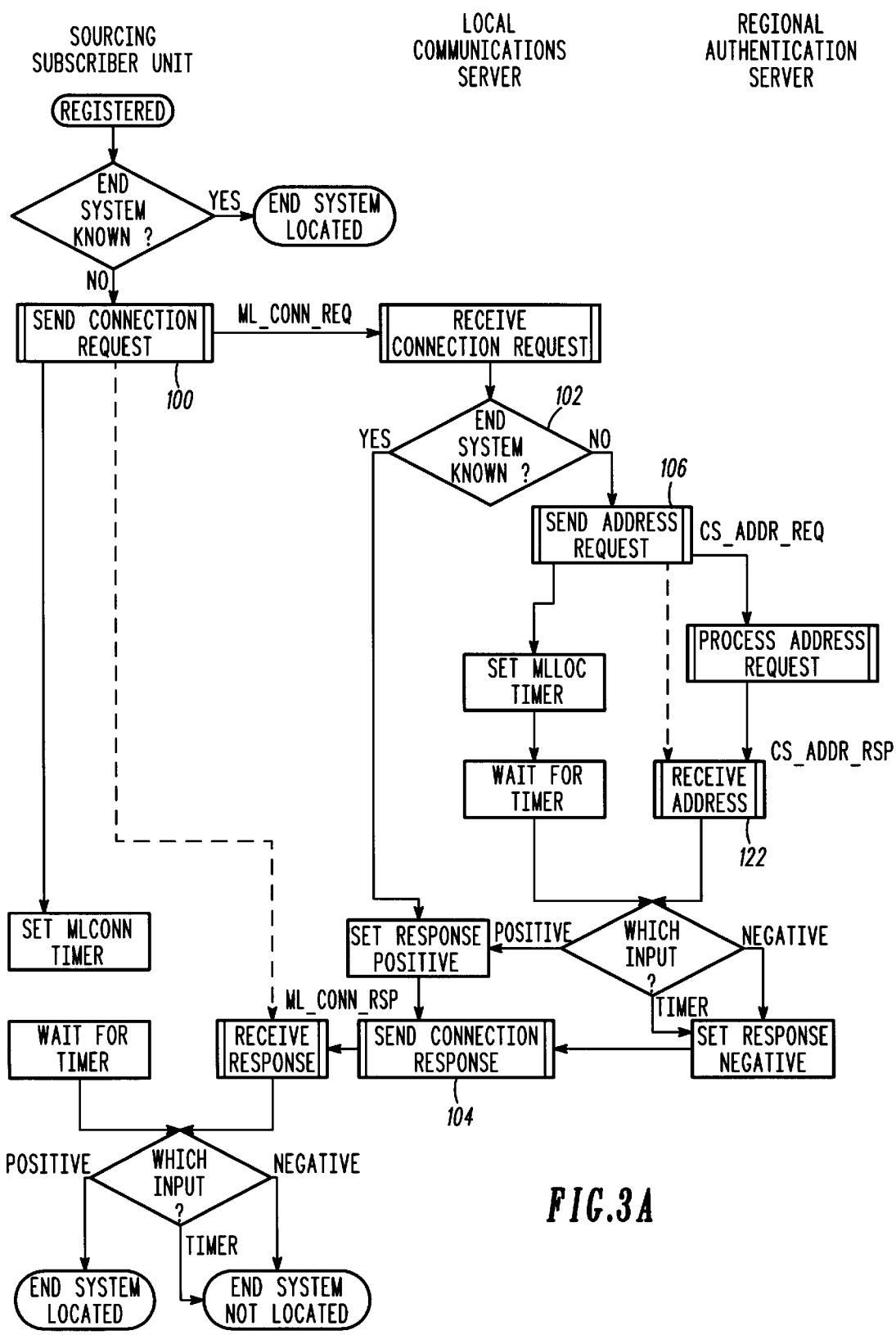
FIGS. 3A–3C illustrate a flow chart of a method for establishing a communication path used in conjunction with the networked communications system illustrated in FIG. 1.
Figure 3B:
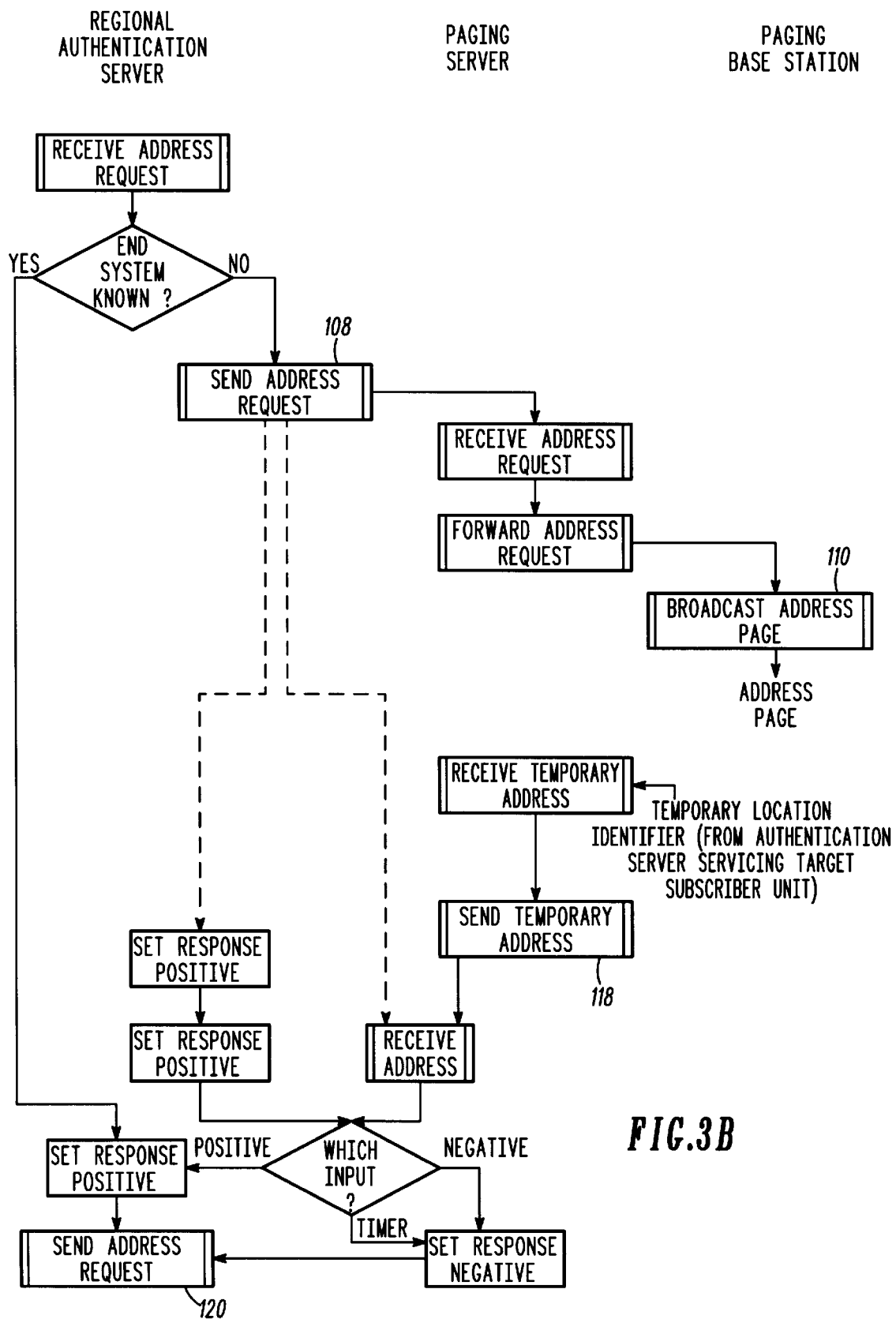
Figure 3C:
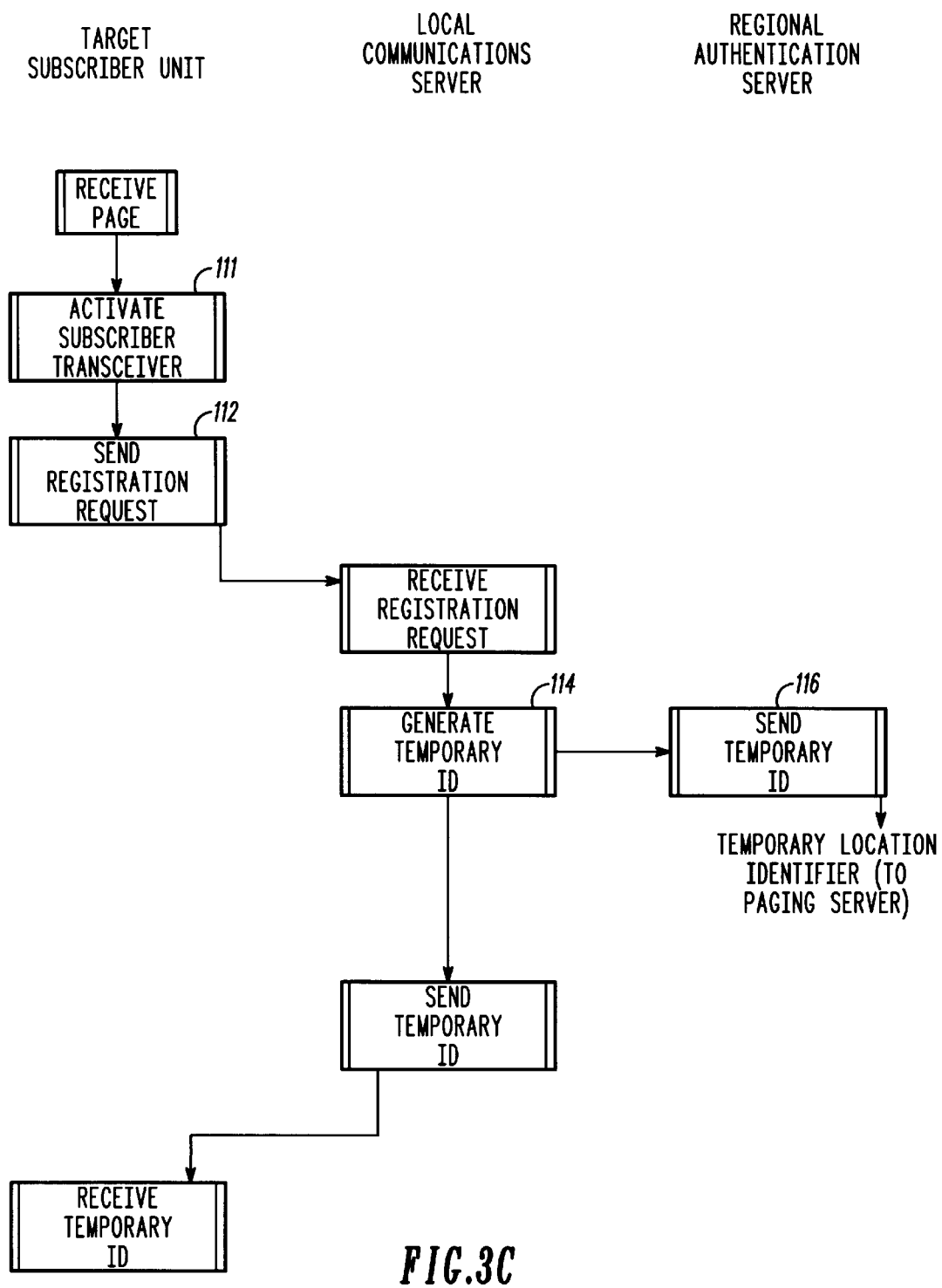

The target subscriber unit, 18, generally illustrated in FIG. 2, comprises an in-band receiver 40, in-band decoder circuit 42, in-band encoder circuit 44, and in-band transmitter 46 for use in establishing a bi-directional communication link over the in-band communications network 12. For receiving a communication over the out-of-band paging network 14, the target subscriber unit 18 is similarly provided with a paging receiver 48 and paging decoder circuit 50. As will be understood by one skilled in the art, these communication circuits are controlled by a processor 56 and a clock/timer circuit 58. A memory 60 is further provided for use in storing communication data and the instructions used to control the processor 56. During operation of the target subscriber unit 18, these components are powered by a power source 62. An optional power source 64 may be provided for use in powering the paging receiver 48 in anticipation of operation at which time the remaining components of the target subscriber unit 18 are not needed. In this manner, in order to minimize the drain on the power source 62, the target subscriber unit 18 may be awakened upon receipt of a paging command whereafter the power source 62 will be utilized to power the remaining components of the target subscriber unit 18.

With reference to FIGS. 1 and 3A–3C, to establish a communications path between the sourcing subscriber unit 16 and the target subscribing unit 18, the sourcing subscriber unit 16 first sends a connection request 100 to its local communications server 20. In an asynchronous transfer mode (ATM) network, the connection request 100 may also incorporate a communication type identifier to provide the target subscriber unit 18 with information regarding the type of communication to be sent over the in-band network, i.e., voice, data, and/or video. The local communications server 20 then determines if it already has an entry for the address 102 of the target subscriber unit 18, i.e., the sourcing subscriber unit 16 has recently issued a communication to the target subscriber unit 18. If the address of the target subscriber unit 18 is known to the local communication server 20 the local communication server 20 issues a connection response 104 to the sourcing subscriber unit 16. If, however, the address of the target subscriber unit 18 is not available to the local communications server 20, the local communication server 20 forms the connection request into an address request message 106 which is issued to the regional authentication server 24. The address request message is preferred to include an identification of the sourcing subscriber unit 16. The regional authentication server 24 forwards the address request message to the paging server 28 which propagates the message 108 through the out-of-band paging network 14, for example, via a satellite 34, to the paging servers 30 within the paging regions subscribed to by the target subscriber unit 18. The remote paging server 30 forwards the address request message to the paging base station 32 upon its receipt. The paging base station 32 then broadcasts 110 the address request message throughout the paging region. At this point, if the target subscriber unit 18 is within the paging region, the paging receiver of the target subscriber unit 18 will receive the broadcast message via the out-of-band paging network 14.

In response to the receipt of the broadcast message, the target subscriber unit 18 will activate or awaken 111 and automatically register 112 with the local communications server 22 found within the paging region. The local communications server 22 provides the target subscriber unit 18 with a temporary location identifier 114 corresponding to an address on the in-band communications network 12. Specifically, the temporary location identifier corresponds to an address with the local communications server 22 through which the target subscriber unit 18 is reachable. Thereafter, the local communications server 22 formulates a response to the address request message which includes the temporary location identifier associated with the target subscriber unit 18 and the identity of the sourcing subscriber unit 16. The response may also include an acceptance status message, i.e., whether or not the target subscriber unit desires to communicate with the sourcing subscriber unit 16 based at least in part on the identity of the sourcing subscriber unit 16. In an ATM network, the response may further incorporate a capability status message, i.e., whether or not the target subscriber unit is capable of accepting the type of communication to be sent by the sourcing subscriber unit 16 over the in-band network based at least in part on the communication type identifier. This response is forwarded 116 by the local communications server to the paging server 30 which, in turn, forwards 118 the response to the regional authentication server 26 where the response is propagated 120 via the out-of-band paging network 14.

Once the response is propagated 120 via the out-of-band paging network 14 the paging server 28 is capable of receiving the response 122 to its address request message. The identity of the sourcing subscriber unit 16 is then used to route the response to the local communications server 20 through the regional authentication server 24. Upon the receipt of the response, the local communications server 20 issues a connection response 104 to the sourcing subscriber unit 16. In this manner, the local communication server 20 has the temporary location identifier of the target subscriber unit 18 whereby the sourcing subscriber unit 16 may communicate directly via the in-band communications network 12 with the local communication server 22 to which the target subscriber unit 18 is attached.

What is claimed is:

1. In a target device, a method of establishing a communication path with a sourcing device coupled to a networked communications system, the method comprising the steps of:

receiving a broadcast message from the networked communications system in a first radio frequency band, where the broadcast message includes an identification of the sourcing device;

automatically registering, responsive to the step of receiving the broadcast message, with a local communications server by exchanging registration messages between the target device and the local communications server in a second radio frequency band; and using the identification of the sourcing device to initiate, at the target device, a connection to the sourcing device to establish the communication path therewith in the second radio frequency band and thence to the local communications server.

2. The method as recited in claim 1, further comprising the step of obtaining, from the local communications server, a temporary location identifier, and wherein the step of using further comprises the step of sending the temporary location identifier to the sourcing device.

3. The method as recited in claim 1, further comprising the step of activating, responsive to the step of receiving the broadcast message, a transmitter resident on the target device.

4. The method as recited in claim 1, wherein the step of using further comprises the step of sending an acceptance status message to the sourcing device based at least in part on the identification of the sourcing device.

5. The method as recited in claim 1, wherein the broadcast message further comprises a communication type identifier and the step of using further comprises the step of sending a capability status message to the sourcing device based on the communication type identifier.

6. The method as recited in claim 1, wherein the step of receiving further comprises receiving the broadcast message from an out-of-band paging network.

7. The method as recited in claim 1, wherein the step of automatically registering further comprises registering with the local communications server on an asynchronous transfer mode (ATM) network.

8. In a target device, a method of establishing a communication path with a sourcing device in a networked communications system, the method comprising the steps of:

receiving a broadcast message, originated by the sourcing device and comprising an identification of the sourcing device, via an out-of-band paging network;

automatically registering, responsive to receipt of the broadcast message, with a local communications server on an asynchronous transfer mode (ATM) network;

obtaining, from the local communications server, a temporary location identifier; and using the identification of the sourcing device to respond to the sourcing device with the temporary location identifier to establish the communication path therewith through the local communications server.

9. The method as recited in claim 8, further comprising the step of activating, responsive to receipt of the broadcast message, a transmitter resident on the target device.

10. The method as recited in claim 9, wherein the step of using further comprises the step of sending an acceptance status message to the sourcing device based at least in part on the identification of the sourcing device.

11. The method as recited in claim 10, wherein the broadcast message further comprises a communication type identifier and the step of using further comprises the step of sending a capability status message to the sourcing device based on the communication type identifier.

12. A target subscriber unit for use in establishing a communications path with a sourcing device in a networked communications system comprising an in-band communications network and an out-of-band paging network, the target subscriber unit comprising:

a paging receiver, adapted to receive messages broadcast via the out-of-band paging network, for use in receiving a broadcast message comprising an identification of the sourcing device;

an in-band transmitter, adapted to transmit message via the in-band communications network, for use in automatically registering, directly responsive to the receipt of the broadcast message, with a local communications server located on the in-band communications network to thereby establish the communications path with the sourcing device via the in-band communications network using the identification of the sourcing device, the in-band transmitter further for use in transmitting messages to the sourcing device via the communications path; and an in-band receiver, adapted to receive messages transmitted via the in-band communications network, for use in receiving messages sent by the sourcing device via the communications path.

13. In a networked communications system, a method of establishing a communication path between a sourcing device and a target subscriber unit, the networked communications system comprising and in-band communications network and an out-of-band paging network, the method comprising the steps of:

sending a broadcast message via the out-of-band paging network, including an identification of the sourcing device;

receiving, at the target subscriber unit, the broadcast message;

causing the target subscriber unit to automatically register, subsequent to the step of receiving and directly in response to the broadcast message, with a local communications server within the in-band communications network;

using the identification of the sourcing device to initiate, at the target subscriber unit, a connection to the sourcing device;

providing the target subscriber unit with a temporary location identifier;

sending a response to the sourcing device comprising at least the temporary location identifier; and using the response to establish the communication path via the in-band communications network.

14. The method as recited in claim 13, wherein the communication path is established via an asynchronous transfer mode (ATM) network.

15. The method as recited in claim 13, further comprising the step of activating, subsequent to the step of receiving and in response to the broadcast message, a transmitter resident on the target subscriber unit.

16. The method as recited in claim 13, wherein the broadcast message comprises an identification of the sourcing device and the step of sending a response further comprises sending an acceptance status message based at least in part on the identification of the sourcing device.

17. The method as recited in claim 13, wherein the broadcast message comprises a communication type identifier and the step of sending a response further comprises sending a capability status message based on the communication type identifier.

* * * * *